United States Patent [19]

Wise

[11] Patent Number: 4,747,746
[45] Date of Patent: May 31, 1988

[54] SINGLE DROP TRAILER WITH VERTICALLY ADJUSTABLE CENTER SECTION

[76] Inventor: Donald E. Wise, 5370 NW. 273rd St., Hillsboro, Oreg. 97124

[21] Appl. No.: 940,808

[22] Filed: Dec. 12, 1986

[51] Int. Cl.$^4$ ................................................ B60P 1/02
[52] U.S. Cl. .................................... 414/481; 414/498; 280/415 R
[58] Field of Search ............... 414/481, 495, 498, 458; 280/43.17, 43.23, 415 B, 415 R, 423 B, 425 A; 187/8.71, 8.5, 18, 8.49

[56] References Cited

U.S. PATENT DOCUMENTS

| | | | |
|---|---|---|---|
| 2,590,210 | 3/1952 | Rogers | 414/481 |
| 2,687,225 | 8/1954 | Martin | 414/481 |
| 2,978,128 | 4/1961 | Polich, Jr. | 414/481 |
| 3,135,401 | 6/1964 | Schramm | 414/495 X |
| 3,489,427 | 1/1970 | Vearnals et al. | 414/495 X |
| 3,666,053 | 5/1972 | Tormey et al. | 187/8.5 |
| 4,408,739 | 10/1983 | Buchsel | 414/495 X |

FOREIGN PATENT DOCUMENTS 2113175  8/1983  United Kingdom ................ 414/495

*Primary Examiner*—Robert J. Spar
*Assistant Examiner*—Vien Nguyen
*Attorney, Agent, or Firm*—Fleit, Jacobson, Cohn & Price

[57] ABSTRACT

A "single drop" semi-trailer is provided including front, intermediate and rear sections. The opposite ends of the center section and the adjacent ends of the front and rear sections included coacting anchor structure operative to releaseably anchor the center section between the front and rear sections, selectively, in high and low positions. When the center section is in the high position its deck surface is spaced appreciably below the deck surface of the front section and substantially horizontally aligned with the deck of the rear section. When the center section is in the low position thereof, its deck surface is spaced appreciably below the deck surface of the rear section. In addition, the front section includes selectively usable landing gear and the center section includes opposite end pairs of opposite side downwardly extendible and upwardly retractable support legs.

14 Claims, 3 Drawing Sheets

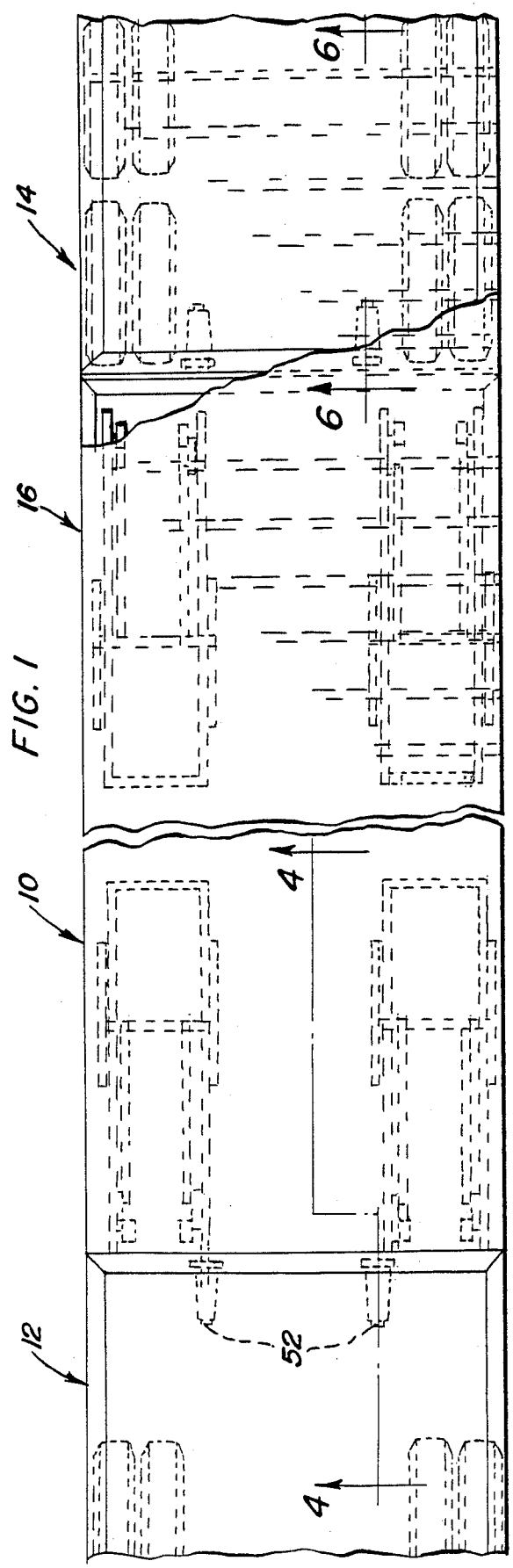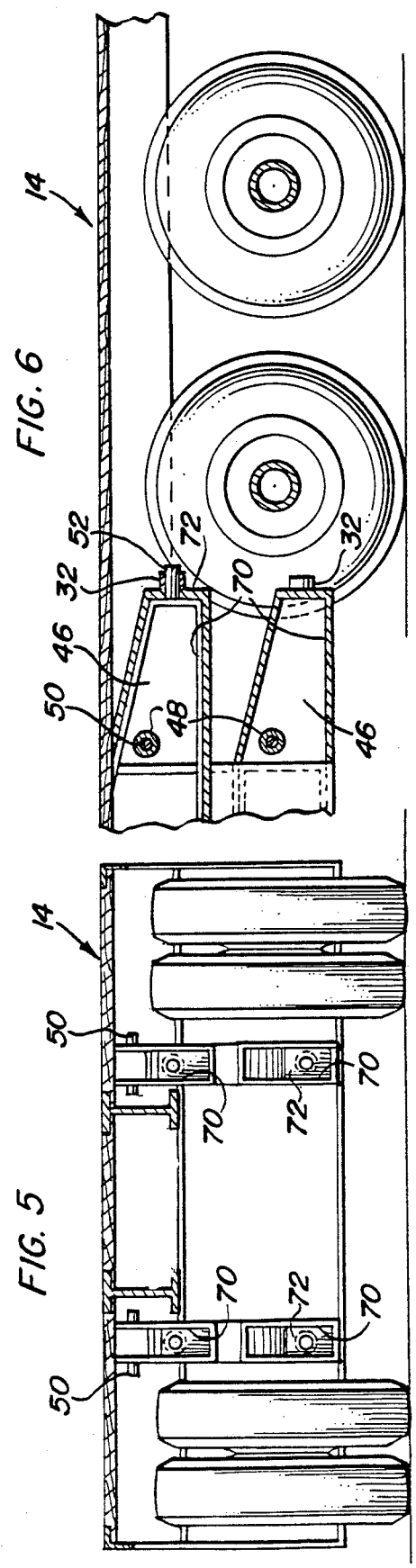

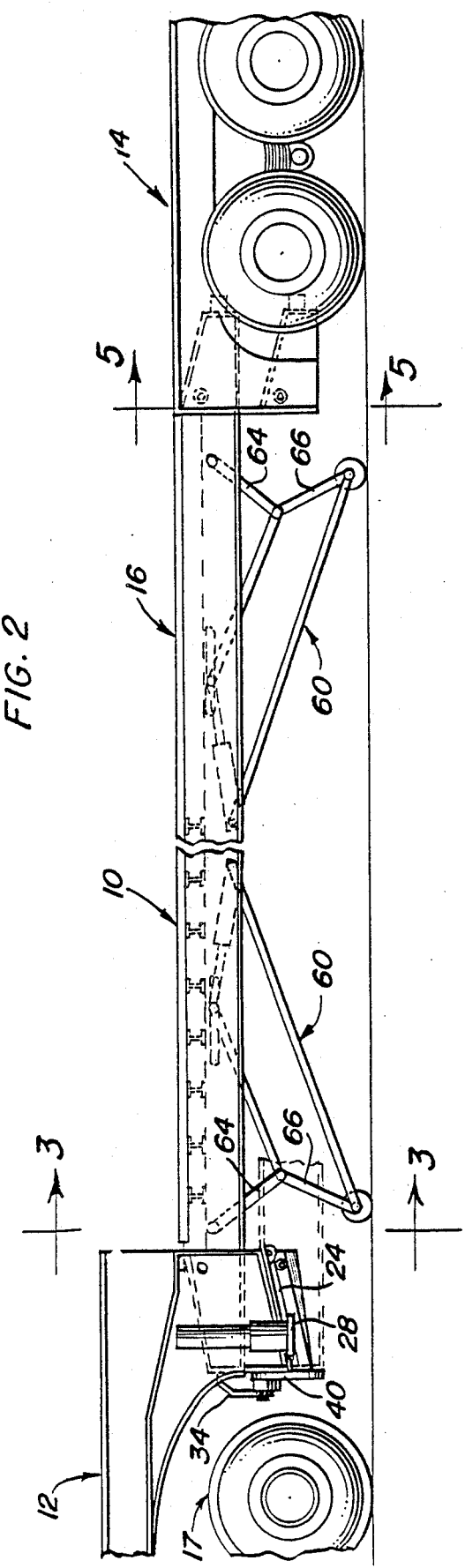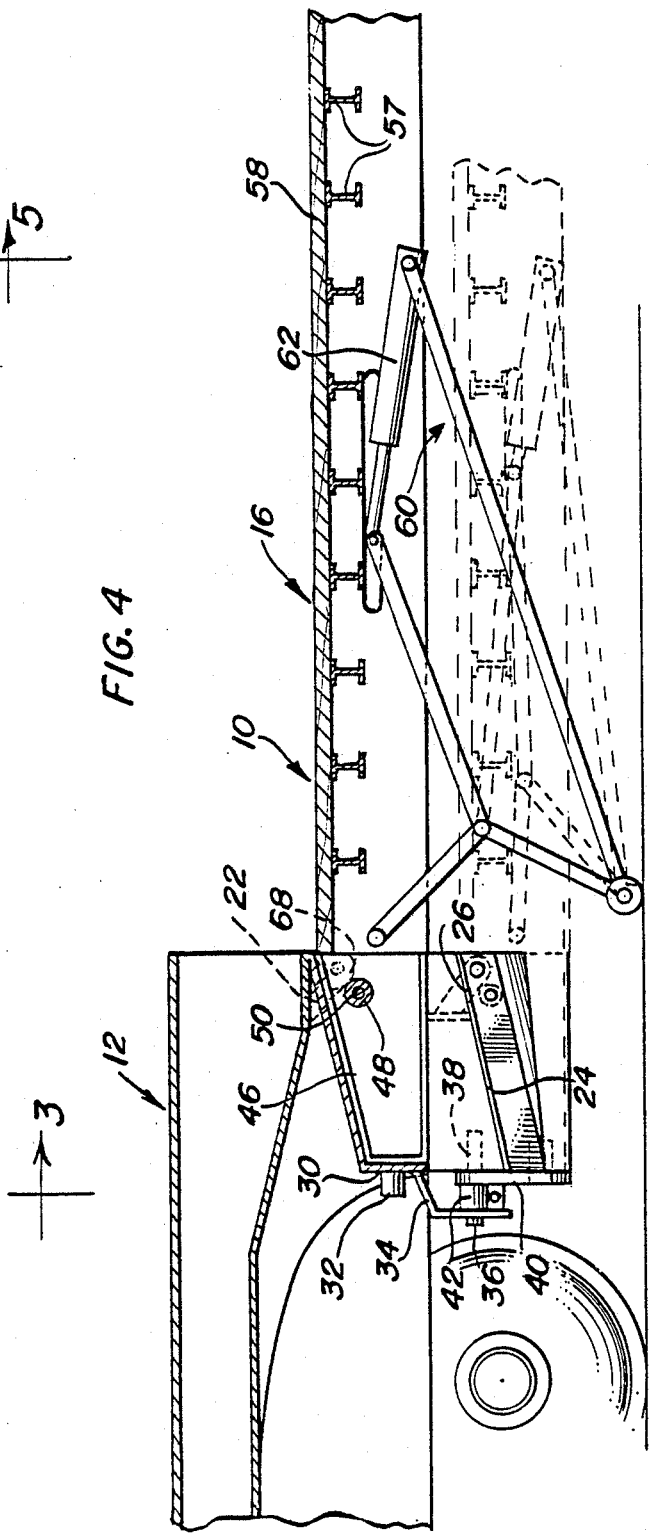

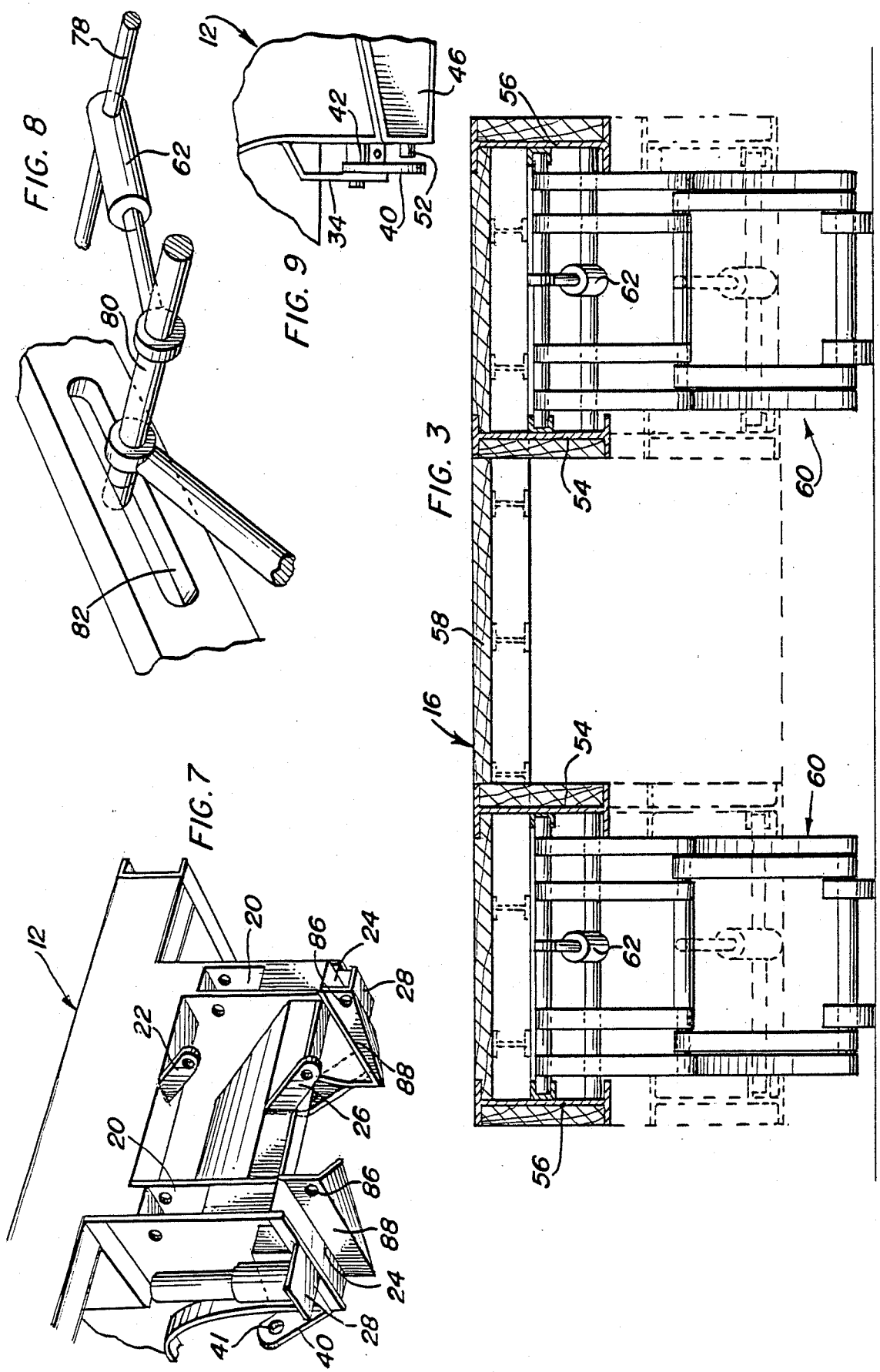

SINGLE DROP TRAILER WITH VERTICALLY ADJUSTABLE CENTER SECTION

BACKGROUND OF THE INVENTION

1. Field Of The Invention

Various different forms of semi-trailers are presently being manufactured including center sections which may be raised and lowered and which are referred to as "drop center" trailers.

A "drop center" trailer, in some instances, includes front and rear sections which are horizontally aligned and interconnected by a center section which may be raised and lowered between lower and upper positions thereof interconnecting the front and rear sections.

When the center section is horizontally aligned with the front and rear sections the trailer is termed a "flat" and may be used to transport various forms of bulk equipment and supplies. However, when the center section of the trailer is lowered to the low position thereof heavy loads may be carried by the trailer and be supported from the center section thereof, including those loads which may not be readily lifted to the high level of the front and rear sections of the trailer.

However, "single drop" trailers comprise trailers including a raised front section and somewhat lower and horizontally aligned rear and center sections. "Single drop" trailers are desired in many instances in that they may transport various different types of loads efficiently.

The trailer of the instant invention comprises a "single drop" trailer, but also includes a vertically adjustable center section and the front and rear sections of the single drop trailer of the instant invention are interconnected by the center section in a manner such that the trailer, when the three sections thereof are secured together, is stronger and also in a manner enabling changing of the center section between it's upper and lower positions in a minimum amount of time. In addition, the trailer is constructed in a manner whereby the trailer may be more quickly loaded with heavy loads.

2. Description Of Related Art

Various different forms of trailers including some of the general structural and operational features of the instant invention heretofore have been known. Examples of these different forms of trailers are disclosed in my prior U.S. Pat. No. 4,290,642 and also in U.S. Pat. Nos. 2,776,146, 2,970,861, 3,019,763 and 3,430,791. However, the "single drop" trailer of the instant invention includes combination of structural features which provide for an extremely strong trailer contruction and a trailer which may have its center section adjusted between its upper and lower positions in a minimum of time.

SUMMARY OF THE INVENTION

The "single drop" trailer of the instant invention provides a trailer which may be quickly converted between a high center section trailer and a low center section trailer and which may be more quickly loaded with heavy loads. In addition, the convertible feature of the trailer provides a vehicle which may more conveniently transport various different loads.

Accordingly, different types of loads may be more readily carried and less time is required to load and unload material for outgoing and return trips. Thus, the trailer of the instant invention is capable of earning more money in a shorter period of time.

The main object of the invention is to provide a trailer construction which may be readily converted between a "single drop" configuration and "drop center" configuration.

Another object of this invention is to provide a trailer in accordance with the preceding object and which may be readily trailed behind a tractor in the manner of a conventional semi-trailer Another important object of this invention is to provide a trailer contruction of the "single drop" type wherein the conversion between the "single drop" configuration and the "drop center" configuration is accomplished through the utilization of structure which coacts to provide a trailer of considerable strength and yet which may be readily converted between the "single drop" and "drop center" configurations.

A further object of this invention is to provide a semi-trailer of the convertible "drop center" type and wherein heavy loads may be more quickly loaded thereon.

Another object of this invention is to provide a "drop center" trailer of the "single drop" type whereby heavy loads may be more safely transported when the vertically adjustable center section of the trailer is in its upper position.

A final object of this invention to be specifically enumerated herein is to provide a trailer construction in accordance with the preceding object and which will conform to conventional forms of manufacture, be of simple construction and easy to use so as to provide a device that will be economically feasible, long lasting and relatively trouble free in operation.

These together with other objects and advantages which will become subsequently apparent reside the details of construction and operation as more fully hereinafter described and claimed reference being had to the accompanying drawings forming a part, hereof wherein like numerals refer to like parts throughout.

BRIEF DESCRIPTION OF THE DRAWINGS

FIG. 1 is a fragmentary top plan view of the trailer of the instant invention with portions of the center and rear decking sections thereof broken away;

FIG. 2 is a side elevational view of the structure illustrated in FIG. 1 with the vertically adjustable center section of the trailer in its upper position and the support legs of the center section in a partially downwardly extended position;

FIG. 3 is an enlarged fragmentary transverse vertical sectional view taking substantially upon the plane indicated by the section line 3—3 of FIG. 2;

FIG. 4 is an enlarged fragmentary longitudinal vertical sectional view taking upon the plane indicated by the section line 4—4 of FIG. 1;

FIG. 5 is an enlarged transferred vertical sectional view taking upon the plane indicated by the section line 5—5 of FIG. 2;

FIG. 6 is an enlarged fragmentary longitudinal vertical sectional view taking upon the plane indicated by the section line 6—6 of FIG. 1;

FIG. 7 is a fragmentary perspective view of the rear portion of the front section of the trailer;

FIG. 8 is a fragmentary perspective view of the mechanism by which the downwardly extendible support legs for the center section are actuated;

FIG. 9 is a fragmentary side elevational view of the left rear portion of the front section of the trailer and with the center section of the trailer in its low position preparatory to disengagement from the front section thereof.

DETAILED DESCRIPTION OF THE INVENTION

Referring now more specifically to the drawings the numeral 10 generally designates the single drop trailer of the instant invention. The trailer 10 includes a front section referred to in general by the reference numeral 12, a rear section referred to in general by the reference numeral 14 and a center section referred to in general by the reference number 16.

The front section 12 comprises a gooseneck section and is equipped with the usual structure such as a depending king pin (not shown) for releaseable connection with the fifth wheel plate of a tractor 17. In addition, the front section 12 also may include one or more fluid cylinders such as the hydraulic jacks disclosed in my prior U.S. Pat. 4,290,642 for engagement with the frame of the associated tractor and for the purpose of maintaining the rear portion of the front gooseneck section 12 above the ground, even when it is disconnected from the forward end of the center section 16.

With the attention now invited with FIGS. 2 and 7 of the drawings, it may be seen that the rear of the front section 12 defines a pair of opposite side rearwardly opening and forwardly tapering sockets 20 and an upper center anchor lug 22. In addition, a pair of lower opposite side anchor locations 24 are defined below the sockets 20 and a lower center anchor lug 26 corresponding to the anchor 22 also is provided. In addition, the opposite sides of the rear portion of the front section 12 include fluid motor downwardly extendible and upwardly retractable landing gear pads 28.

The inner ends of the sockets 20 are closed by front walls 30, see FIG. 4, and the front walls 30 include sleeves 32 secured therethrough. Also, a depending bracket 34 is carried by each front wall 30 and receives the forward end 36 of an anchor pin 38 therethrough, each anchor pin 38 being solidly mounted from the depending rear portion of the front section 12 and projecting forwardly therefrom. An upstanding slip arm 40 is slidably mounted on each front end 36 of the pins 38 and the lower end of each sliparm 40 includes an opening 41 rotatably and therethrough corresponding to the interior of the sleeve 32 disclosed thereabove. A horseshoe spacer 42 is disposed about the exposed front end 36 of each pin 38 between the lower end of the corresponding bracket 34 and the upper end of the associated sliparm and thus maintains the sliparm 40 in a rearmost position on the pin 38. If the horseshoe spacers 42 are removed from about the front ends 36 of the pins 38, the support arms of 40 may shift forwardly along the front ends of 36 until they abut the rear sides of the lower ends of the brackets 34, see FIGS. 4 and 9.

The front and rear ends of the center section 12 include opposite side outwardly projecting and tapering projections 46, each projection 46 being hollow and including an interior cross sleeve 48 through which a spring loaded pin 50 may be received. In addition, each of the projections 46 includes an endwise outwardly projecting shank 52 and the shanks 52 are snugly receivable within the sleeves 32 and also through the aforementioned openings 41 formed in the lower ends of the arms 40 when the arms 40 are in their rear most positions.

The center section 16 includes a pair of longitudinal outboard beams 56 as well as a pair of longitudinal inboard beams 54 and transverse connecting beams 57 and decking 58. The front and rear ends of each pair of beams 54 and 56 support roller footed leg assemblies referred to in general by the reference numerals 60 therefrom and each leg assembly 60 is downwardly extended and upwardly retracted through the utilization of a corresponding double acting fluid motor 62.

The leg assemblies 60 may be independently or simulataneously actuated and each leg assembly includes a pair of relatively pivotably connected links 64 and 66 which are swung slightly past center positions when the leg assemblies 60 are disposed in their lowermost positions. Also, the front end of the center section 16 includes a pair of laterally spaced apart transversely apertured flanges 68 which may be selectively registered with either the anchor lug 2 when the projections 46 are received in the sockets 20 or the anchor lug 26 when the projections 46 are disposed in the anchor locations 24, a transverse pivot pin (not shown) being securable through either anchor lug 22 and 26 and the center flanges 68.

The rear section 14 defines opposite side upper and lower sockets 70 corresponding to the sockets 20 and the inner ends of sockets 70 are closed by endwalls 72 through which sleeves corresponding to the sleeves 32 are secured. Also the rear end of the center section includes opposite sides projections 46 which are snugly seating receivable in the sockets 70. Finally, the free ends of rear projections 46 also include shanks 52 receivable through the rear sleeves 32.

From FIG. 8 of the drawing it may be seen that each of the fluid motors 62 is pivotally anchored at one end to a transverse anchored pin 78 and pivotally anchored to a transverse operating pin 80 whose opposite ends are sliding supported in slots 82 defined by the corresponding beam 54 and 56.

From the phantom line showing in FIGS. 2 and 4 it may be seen that the projections 46 may be anchored in position immediately beneath the anchor locations 24 with the shanks 52 on the forward end of the center section 16 received through the openings 41 provided therefor in the lower ends in the support arms 40, when the support arms 40 are in the rearmost positions thereof illustrated in FIG. 4. However, when it is desired to release front projections 46 from the support arms 40 when the projections 46 are disposed immediately beneath the anchor locations 24, the horseshoe spacers 42 are removed and the support arms 40 are slid forwardly along the forward ends 36 of the pins 38 in order to slid the lower ends of the support arms 40 out of engagement with the shanks 52. Then, the projections 46 at the front end of the center section 16 are completely disengaged from the front section 12 of the trailer 10. Of course, the support arms 40 may be locked in their forwardmost positions by reinstalling the horsehoe spacers 42 behind the upper ends of the support arms 40, see FIG. 9.

Assuming that the center section 16 is in the low position thereof illustrated in phantom lines in FIG. 4 and it is desired to on load a heavy bulk load from the front end of center section 16, the landing gear pads 28 are downwardly extended to engage the ground. The kingpin (not shown) is thereafter released, and the tractor 17 is pulled forward from beneath the front gooseneck section 12. Thereafter, the landing gear assemblies are actuated to lower the front end of the trailer 10 to the ground. Thereafter, the horseshoe sleeves 42 are removed and the support arms 40 are forwardly displaced to positions forward of the shanks 5 afterwhich the horseshoe spacers 42 are reinstalled behind the support arms 40, see FIG. 9. Thereafter, the front end of the trailer 10 is again elevated through utilization of the landing gear pads 28 and the tractor 17 is again backed beneath the forward gooseneck section 12 and coupled thereto. Thereafter, the pivot pin securing the anchor lug 26 to the center flanges 68 is removed and the front section 12 is blocked relative to the frame of the tractor 10 and the latter may be moved forward thus exposing the front end of the center section 16 for ease in loading equipment thereon. Of course, when it is desired to reestablish the anchored connection between the front section 12 and the center section 16, the above process is reversed.

When the section 16 is in the upper position, the front pins 50 are of sufficient length to also extend through the openings 86 therefor in the guide flanges 88 defining the inner extremeties of the locations 24.

When the trailer 10 is in the operational mode illustrated in FIG. 2, a long, relatively high load may be carried on the horizontally aligned sections 14 and 16 and a longitudinally short load of less height may be carried on the section 12 without exceeding height limitations. When the center section 16 is in its lower position, a heavy longitudinally shorter load may be loaded onto and unloaded from the front end of section 16 and shorter loads may be carried by the sections 12 and 14. Still further, a longitudinally short and high load may be carried on the section 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A single drop semi-trailer including a front fifth wheel connectable gooseneck section, a rear wheeled section and a center intermediate deck section extending between said front and rear sections, said front, center and rear sections each defining an upwardly facing deck surface, said front section deck surface being disposed at an elevation spaced above the elevation of said rear section deck surface, said front, center and rear sections including coacting anchor means operative to selectively removably anchor said center section between said front and rear section in high and low positions relative to said front and rear sections and wherein said center section deck surface is substantially horizontally aligned with said rear section deck surface when in said high position, said gooseneck section including coupling means for releaseable coupling to a fifth wheel equipped motorized tractor vehicle, said center section including opposite end pairs of opposite side downwardly extendable and upwardly retractable support leg means for support of said center section directly from the ground and height adjustment of said center section relative to the ground.

2. The trailer of claim 1 wherein said gooseneck and rear sections each define a pair of opposite side horizontally outwardly opening sockets having open outer ends and closed inner ends and said center section, when anchored in said high position, includes opposite end pairs of opposite side outwardly extending projections received in said sockets, said gooseneck and rear sections including opposite side lower anchor positions spaced below the corresponding sockets and in which said projections are removably anchored, by said anchor means, when said center section is said low position.

3. A single drop semi-trailer including a front fifth wheel connectable gooseneck section, a rear wheeled section and a center intermediate deck section extending between said front and rear sections, said front, center and rear sections each defining an upwardly facing deck surface, said front section deck surface being disposed at an elevation spaced above the elevation of said rear section deck surface, said front, center and rear sections including coacting anchor means operative to selectively removably anchor said center section between said front and rear section in high and low positions relative to said front and rear sections and wherein said center section deck surface is substantially horizontally aligned with said rear section deck surface when is said high position, said gooseneck section including coupling means for releaseable coupling to a fifth wheel equipped motorized tractor vehicle, said gooseneck and rear sections each defining a pair of opposite side horizontally outwardly opening sockets having open outer ends and closed inner ends and said center section, when anchored in said high position, includes opposite end pairs of opposite side outwardly extending projections received in said sockets, said gooseneck and rear sections including opposite side lower anchor positions spaced below the corresponding sockets and in which said projections are removably anchored, by said anchor means, when said center section is in said low position, said inner ends of said sockets including end walls having pilot openings formed therethrough, said projections each including a pilot shank projecting endwise outwardly therefrom receivable through the corresponding pilot opening.

4. The trailer of claim 3 wherein said sockets taper inwardly and projections enjoy a corresponding outward taper for snug reception in said sockets.

5. The trailer of claim 4 wherein said projection and the portions of said center deck section include means defining transverse passages registerable with each other when said projections are received in said sockets with said pilot shank projected through said pilot openings, and an anchor pin removably secured through each set of registered passages.

6. The trailer of claim 1 wherein each of said opposite side support leg means of said center section includes an independently operable actuator therefor.

7. The trailer claim 6 wherein said front gooseneck section includes downwardly projectable and upwardly retractable opposite side landing gear means.

8. The trailer of claim 3 wherein said pilot openings are defined by the interiors of sleeves secured through said end walls.

9. The trailer of claim 8 wherein said sockets taper inwardly and said projections enjoy a corresponding outward taper for snug reception in said sockets.

10. The trailer of claim 9 wherein said projection and the portions of said center deck section include means defining transverse passages registerable with each other when said projections are received in said sockets with said pilot shank projected through said pilot openings, and an anchor pin removably secured through each set of registered passages.

11. The trailer of claim 3 wherein each said lower anchor positions terminates forwardly at a depending support arm whose lower end defines a pilot opening formed therethrough in which the corresponding center section projection pilot shank is receivable when said forward projections of said center section are disposed of lower anchor positions, said support arms being forwardly displaceable to positions with lower ends thereof disposed forward of the pilot shanks of said center section forward projections.

12. The trailer of claim 11 wherein said sockets taper inwardly and said projections enjoy a corresponding outward taper for snug reception in said sockets.

13. The trailer of claim 12 wherein said projection and the portions of said center deck section include means defining transverse passages registerable with each other when said projections are received in said sockets with said pilot shank projected through said pilot openings, and an anchor pin removably secured through each set of registered passages.

14. The trailer of claim 2 wherein said rear section lower anchor positions also comprise outwardly opening sockets having open outer ends and closed inner ends, said gooseneck section lower anchor positions defining downwardly and outwardly opening sockets having open outer ends and lower sides and an end wall defining member shiftably supported from said gooseneck section for movement between predetermined forward inactive and rear active positions, said inner ends of said sockets including end walls, said end walls and end wall defining members having pilot openings formed therethrough, said projections each including a pilot shank projecting endwise outwardly therefrom and receivable through the corresponding openings.

* * * * *